United States Patent

[11] 3,540,341

| [72] | Inventor | George W. Sederberg, |
| | | Highland Heights, Kentucky |
| [21] | Appl. No. | 726,659 |
| [22] | Filed | May 6, 1968 |
| [45] | Patented | Nov. 17, 1970 |
| [73] | Assignee | Cincinnati Milacron Inc. |
| | | Cincinnati, Ohio |
| | | a corporation of Ohio |

[54] MATERIAL CUTTING MACHINE HAVING RECIPROCATING CUTTING BLADE WITH A NONRECIPROCATING GUIDE
8 Claims, 4 Drawing Figs.

[52] U.S. Cl. .................................................. 83/563,
  83/427, 83/428, 83/433
[51] Int. Cl. .................................................. B26d 1/00
[50] Field of Search .......................................... 83/427,
  428, 561, 559, 556, 635, 647, 563, 433, 925C.C.

[56] References Cited
UNITED STATES PATENTS

| 1,172,058 | 2/1916 | Scheyer .................. | 83/561X |
| 3,184,158 | 5/1965 | Beeren et al. ........... | 83/215X |
| 3,245,295 | 4/1966 | Mueller ................... | 83/428X |
| 3,304,820 | 2/1967 | Mueller et al. .......... | 83/428X |

Primary Examiner—James M. Meister
Attorney—Frank C. Leach, Jr.

ABSTRACT: A material cutting machine has a substantially vertical cutting blade adapted to cut material disposed in a substantially horizontal plane. A nonreciprocating guide continuously guides and supports the cutting blade and is lifted with the cutting blade when the cutting blade is lifted from engagement with the material for rotation of both the cutting blade and the guide to change the heading of the cutting blade.

Patented Nov. 17, 1970

3,540,341

INVENTOR
GEORGE W. SEDERBERG

BY  *Frank C. Leach jr.*

ATTORNEY.

MATERIAL CUTTING MACHINE HAVING RECIPROCATING CUTTING BLADE WITH A NONRECIPROCATING GUIDE

In my copending U.S. Pat. application, Ser. No. 636,965, filed May 8, 1967, now abandoned and assigned to the same assignee as the assignee of the present application, there is shown a material cutting machine in which a reciprocating cutting blade has a support or guide rod attached thereto for reciprocation therewith. As mentioned in my aforesaid application, certain types of synthetic fabrics have relatively low melting temperatures at which they tend to fuse. Thus, any reciprocating movement between the material and the cutting structure increases the temperature of the material being cut whereby the opportunity for fusing of the material exists.

In my aforesaid application, an additional structure was employed to prevent the cutting structure, other than the cutting blade, from engaging the material being cut when fusing problems existed. The present invention is an improvement over the material cutting machine of my aforesaid application in that only the cutting blade reciprocates and not the guide means. Accordingly, the guide means of the present invention eliminates the problem of fusing of the material without requiring an additional structure.

In the material cutting machine of my aforesaid application, the cutting blade is lifted from engagement with the lower layers of the material during reciprocation of the cutting blade. This results in additional forces being exerted on the cutting blade since the cutting blade must reenter a portion of the material during each reciprocation.

In the present invention, the reciprocating cutting blade remains in engagement with all of the layers of the material throughout the reciprocation of the cutting blade. Thus, the forces exerted on the cutting blade of the present invention are reduced in comparison with those on the cutting blade of my aforesaid application.

The cutting blade of the present invention is supported so that its lower end always remains beneath the plane of the support means for the material during reciprocation of the cutting blade while it is in cutting engagement with the material. Therefore, the cutting blade does not have to reenter a portion of the material during each reciprocation.

The nonreciprocating guide means of the present invention is capable of supporting the lower end of the cutting blade during its reciprocation. Thus, even though the guide means of the present invention does not reciprocate, it still supports the lower portion of the cutting blade at all times.

An object of this invention is to provide a nonreciprocating guide for a reciprocating cutting blade utilized in a material cutting machine.

Another object of this invention is to provide a reciprocating cutting blade that remains in engagement with the entire thickness of the material during cutting.

A further object of this invention is to provide a guide that supports a reciprocating cutting blade irrespective of the position of the cutting blade.

Other objects of this invention will be readily perceived from the following description, claims, and drawing.

This invention relates to an improvement in a material cutting machine having a substantially vertical cutting blade with means to support material in a substantially horizontal plane to be cut by the cutting blade when the cutting blade is reciprocated by suitable means. The cutting blade has cutting surfaces on its leading edge and an edge connecting the ends of its leading and trailing edges remote from the reciprocating means. The improvement comprises nonreciprocating guide means cooperating with the cutting blade to guide the cutting blade during reciprocation of the cutting blade. The guide means is moved with the cutting blade when the cutting blade is removed by means from cutting engagement with the material being cut. Means rotate the cutting blade and the guide means to change the heading of the leading edge of the cutting blade when the cutting blade and the guide means are removed from engagement with the material.

The attached drawing illustrates a preferred embodiment of the invention, in which.

Figure 1:
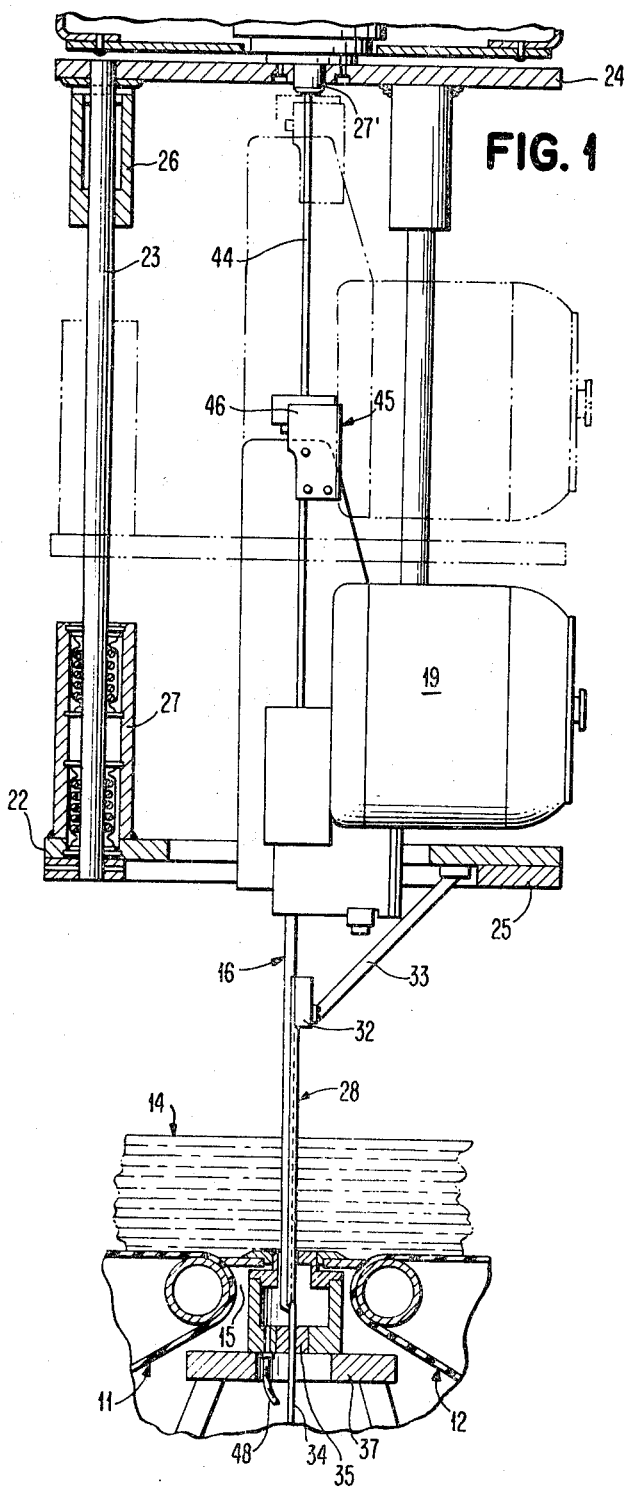
FIG. 1 is a vertical sectional view, partly in elevation, illustrating the relation of various parts of the material cutting machine including the nonreciprocating guide means of the present invention.

Referring to the drawing and particularly FIG. 1, there is shown a pair of endless bands or belts 11 and 12 that are part of a material cutting machine of the type more particularly shown and described in my aforesaid application. The endless bands 11 and 12 are adapted to support material 14 thereon as more particularly shown and described in my aforesaid application.

As described in my aforesaid application, the endless bands 11 and 12, which are flexible and formed of any suitable material, are adapted to be driven in unison to move the material 14 thereon in a longitudinal direction. The endless bands 11 and 12 are spaced from each other to form a transverse passage or throat 15 therebetween for reception of a cutting blade 16.

Figure 3:
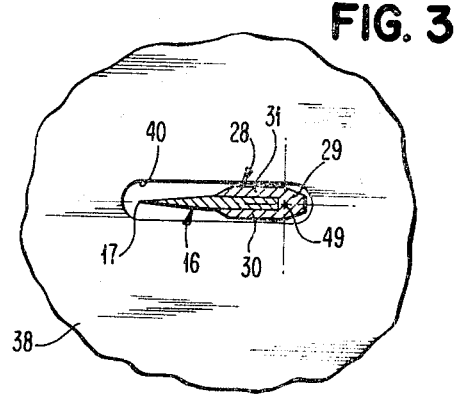
FIG. 3 is a top plan view, partly in section, of a portion of FIG. 2 and taken along line 3-3 of FIG. 2.

As shown in FIG. 3, the cutting blade 16 has its leading edge 17 sharpened to a point to form a cutting surface along its entire length. The cutting blade 16 has its upper end attached to a motor 19, which causes reciprocation of the cutting blade 16 with respect to to the material 14 supported on the endless bands 11 and 12 whereby the material 14 is cut. The upper end of the cutting blade 16 is connected to the shaft of the motor 19 through suitable means (not shown) such as a slider secured to the upper end of the cutting blade 16, a crank wheel on the shaft of the motor 19, and a connecting rod between the crank wheel and the slider.

Figure 4:
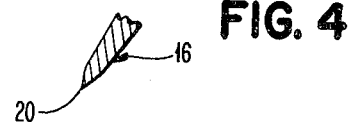
FIG. 4 is a sectional view of the connecting edge of the cutting blade and taken along line 4-4 of FIG. 2.

The cutting blade 16 has an edge 20 (See FIG. 2) connecting the bottom end of the leading edge 17 with the bottom end of trailing edge 21. The edge 20 is sharpened to a point along its entire length (See FIG. 4). Thus, the cutting blade 16 has both the leading edge 17 and the connecting edge 20 sharpened to provide cutting surfaces whereby cutting of the material 14 occurs when the connecting edge 20 is moved into engagement with the material 14.

The motor 19 is fixedly secured to a vertically movable plate or disk 22 (See FIG. 1), which functions as a carriage, for support thereby. The plate 22 is slidably supported on rods 23, which extend between an upper plat or disk 24 and a lower plate or disk 25. The rods 23 are permanently secured to both of the plates 24 and 25.

Each of the rods 23 is permanently secured to the plate 24 through being pinned to a bushing 26, which is welded to the plate 24. Each of the rods 23 is permanently secured to the plate 25 by a pin. Ball bearing bushings 27, which surround the rods 23 and are secured to the plate 22 by suitable means such as brazing, for example, prevent shaking or vibration of the plate 22 during any movement of the plate 22 away from the lower plate 25.

As more particularly shown and described in my aforesaid application, the upper plate 24 is fixedly secured to a shaft 27', which is rotatably carried by an upper saddle. The upper saddle is adapted to slidably move transversely to the bands 11 and 12 to cause movement of the cutting blade 16 through the transverse passage or throat 15, which is formed between the endless bands 11 and 12.

The cutting blade 16 is slidably disposed within a nonreciprocating guide 28. The guide 28 is U-shaped and includes a base portion 29 (See FIG. 3) with sides 30 and 31 to receive the cutting blade 16 therein for reciprocation relative thereto.

The upper end of the guide 28 is fixedly supported within a guide block 32 (See FIG. 1), which is secured to the lower end of a bracket 33. The upper end of the bracket 33 is fixedly secured to a portion of the structure that is lifted when the cutting blade 16 is lifted. As shown in FIG. 1, the upper end of the bracket 33 is fixedly secured to the plate 22.

The lower end of the guide 28 has a rod 34 fixedly secured thereto and extending downwardly therefrom for cooperation therewith. The rod 34 extends through a bushing 35, which is fixedly supported within a hollow member 36 (See FIG. 2).

The hollow member 36 is rotatably supported by a lower saddle (not shown) in the manner more particularly shown and described in my aforesaid application. The lower saddle is adapted to slide in a transverse direction relative to the endless bands 11 and 12 in coordination with the upper saddle as more particularly shown and described in my aforesaid application.

The hollow cylindrical member 36 is shown disposed on an annular member 37 and fixedly secured thereto. The annular member 37 is adapted to be rotated at the same time that the carriage is rotated. Thus, the hollow cylindrical member 36 is rotatable whenever the cutting blade 16 is rotated.

Since the hollow member 36 has a support member 38 fixedly mounted thereon to form an enclosed chamber 39 therebetween within which the lower ends of the cutting blade 16 and the guide 28 are disposed during cutting, the rotation of the hollow member 36 ensures that a slot or opening 40 (See FIG. 3) in the upper surface of the support member 38 is always properly positioned to permit reception of the cutting blade 16 and the guide 28 whenever they are removed from the support member 38.

Since the space between the endless bands 11 and 12 is filled by throat way sections 41 and 42 and an annular member 43, which surrounds the upper end of the support member 38 and overlies the throat way sections 41 and 42, the only opening is the small slot or opening 40 in the support member 38. It should be understood that a gap structure also is utilized as shown and described in my aforesaid application and in the copending U.S. Pat. application of Edward C. Bruns, Ser. No. 636,964, filed May 8, 1967, now U.S. Pat. No. 3,465,630, and assigned to the same assignee as the assignee of the present application.

As previously mentioned, the plate 22, which carries the reciprocating motor 19 of the cutting blade 16 thereon, is slidably mounted on the rods 23. The plate 22 and its supporting structure are adapted to be moved from the solid line position of FIG. 1 to the phantom line position through actuation of a cable 44. As more particularly shown and described in my aforesaid application, the cable 44 is attached to a U-shaped bracket 45, which has its legs (one shown at 46) fixedly attached to the motor 19.

Thus, when the cable 44 is pulled upwardly in the manner more particularly shown and described in my aforesaid application, the plate 22, the motor 19, the cutting blade 16, and the guide 28 are lifted upwardly so that the cutting blade 16 and the guide 28 are removed from engagement with the material 14.

While the use of the nonreciprocating guide 28 substantially reduces the heat generated in the material 14, there is still some heat created due to the friction of the cutting blade 16 sliding in the guide 28. Furthermore, the reciprocation of the cutting blade 16 may cause some particles to be lodged between the reciprocating cutting blade 16 and the support member 38.

Accordingly, pressurized air is introduced into the chamber 39 to remove the particles of material from between the cutting blade 16 and the support member 38. This pressurized air also serves to cool the cutting blade 16 and the nonreciprocating guide 28 to further insure against any undesired heat being generated.

The pressurized air is introduced into the chamber 39 through a passage 47 in the bottom of the hollow member 36. The passage 47 is connected by a flexible hose 48 to a source of pressurized air in a suitable manner such as that more particularly shown and described in my aforesaid application.

Considering the operation of the present invention, the material 14 is disposed on one of the endless bands 11 and 12 initially. It will be assumed that this is the band 11.

The movement in the longitudinal direction of the material 14 relative to the cutting blade 16 and the transverse movement of the cutting blade 16 relative to the material 14 is controlled by a numerical control apparatus (not shown) in the manner more particularly shown and described in my aforesaid application. The numerical control apparatus also determines when the cutting blade 16 and the guide 28 are lifted or removed from engagement with the material 14 and rotated relative thereto.

With the material 14 disposed on the endless band 11, the endless bands 11 and 12 are driven in unison to advance the material 14 longitudinally until one end of the material 14 is disposed for cutting engagement by the cutting blade 16. The numerical control apparatus also has positioned the cutting blade 16 at the desired heading and at the desired transverse position in the transverse passage 15. Accordingly, cutting of the material 14 begins.

When it is desired to change the heading of the blade 16 to produce a cut at a sharp angle relative to the prior cut of the material 14, the blade must be lifted or removed from cutting engagement with the material 14 before the heading of the blade 16 is changed by rotating the support structure of the cutting blade 16 and the guide 28. Then, it is necessary to return the cutting blade 16 and the guide 28 into the position shown in FIG. 1 in which the cutting blade 16 is in cutting engagement with the material 14. This occurs after completion of rotation of the cutting blade 16 to provide the new heading for the cutting blade 16. The numerical control apparatus automatically controls all of these movements as more particularly shown and described in my aforesaid application.

When it is necessary to lift or remove the reciprocating cutting blade 16 and the nonreciprocating guide 28 from the material 14, the cable 44 is pulled upwardly in the manner more particularly shown and described in my aforesaid application. This results in both the cutting blade 16 and the guide 28 being lifted or removed from the material 14.

Then, the cutting blade 16 and the guide 28 are rotated about an axis 49 (See FIG. 3), which is the longitudinal axis of the rod 34. The axis 49 is disposed slightly rearward of the trailing edge 21 of the cutting blade 16.

The rotation of the cutting blade 16 and the guide 28 is accomplished through rotating the shaft 27' in the manner shown and described in my aforesaid application. This rotates the plates 24 and 25, the connecting rods 23, and the entire carriage on which the motor 19 is supported.

Figure 2:
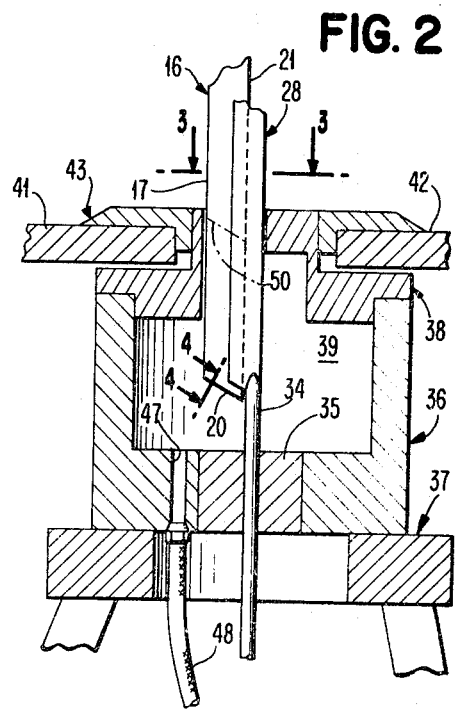
FIG. 2 is an enlarged sectional view of the lower portion of the cutting blade and guide means and the support structure cooperating therewith.

At the same time that the upper support structure for the cutting blade 16 and the guide 28 is rotated, the support member 38 also is rotated to maintain the slot or opening 40 in proper alignment with the cutting blade 16 and the guide 28 to permit the cutting blade 16 and the guide 28 to return to the position of FIG. 2 when rotation of the cutting blade 16 and the guide 28 has been completed. The rotation of the support member 38 is accomplished in the manner particularly shown and described in my aforesaid application. The rotation of the cutting blade 16 and the guide 28 are synchronized with rotation of the support member 38.

When the cutting blade 16 and the guide 28 are lifted or removed from engagement with the material 14 through lifting upwardly on the cable 44, the rod 34 remains in engagement with the bushing 35. As a result, the cutting blade 16 is maintained in its reciprocating plane since the guide 28 is continuously supported at its lower end and maintained in the desired position through the rod 34.

Accordingly, when the cutting blade 16 and the guide 28 are returned to the position of FIG. 1, the rod 34 ensures that the guide 28 and the cutting blade 16 enter the slot 40 in the support member 38 and that the cutting blade 16 enters the material 14 in a substantially vertical plane to ensure a true cut. When the cutting blade 16 is returned to the position of FIG. 1, the reciprocation of the cutting blade 16 does not lift the cutting blade 16 above the bottom of the material 14 that is being cut. Thus, the reciprocating cutting blade 16 remains beneath the material 14 during cutting engagement therewith.

The maximum upward position of the cutting blade 16 during cutting is shown by phantom line 50 in FIG. 2. The lowermost position of the cutting blade 16 is that shown in FIG. 2. Thus, the nonreciprocating guide 28 continuously supports the lower end of the cutting blade 16 during its reciprocation.

While the cutting blade 16 has been described as utilized in a cutting machine having the movable endless bands 11 and 12 driven in unison to move the material 14 longitudinally relative to the cutting blade 16, it should be understood that the endless bands 11 and 12 could be replaced by a support table in which a single flexible band does not move but has a transverse passage therein move. One suitable example of this type of support table is shown and described in U.S. Pat. No. 3,262,348 to Wiatt et al. In this type of arrangement, the cutting blade 16 is moved longitudinally relative to the material 14.

It also should be understood that the endless bands 11 and 12 or the support table of the aforesaid Wiatt et al. patent could be moved transversely relative to the cutting blade 16 rather than moving the cutting blade 16. It is only necessary for the material 14 and the cutting blade 16 to have both relative transverse and longitudinal movement between the material 14 and the cutting blade 16 to produce the desired result.

While the cutting blade reciprocating structure has been shown as disposed above the material 14, it should be understood that this structure could be disposed beneath the endless bands 11 and 12 with the cutting blade 16 reversed and the guide 28 above the bands 11 and 12. It is only necessary that the cutting blade 16 be reciprocated while being continuously supported by the guide 28 and that the cutting blade 16 and the guide 28 be capable of being rotated and removed from the material being cut.

An advantage of this invention is that continuous support is provided to a reciprocating cutting blade. Another advantage of this invention is that the reciprocating cutting blade remains in engagement with the entire thickness of the material during reciprocation. A further advantage of this invention is that it reduces the fusing problem that exists when cutting certain materials.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. In a material cutting machine having a substantially vertical cutting blade, means to support material in a substantially horizontal plane to be cut by said cutting blade, means to reciprocate said cutting blade, and said cutting blade has cutting surfaces on its leading edge and an edge connecting the ends of its leading and trailing edges remote from said reciprocating means, the improvement comprising:

guide means cooperating with said cutting blade to guide said cutting blade during reciprocation of said cutting blade, said cutting blade moving relative to said guide means during reciprocation of said cutting blade by said reciprocating means;

means to remove said cutting blade from cutting engagement with the material being cut, said removal means moving said guide means with said cutting blade; and means to rotate said cutting blade and said guide means to change the heading of the leading edge of said cutting blade when said cutting blade and said guide means are removed from engagement with the material.

2. The improvement according to claim 1 in which said guide means continuously supports the end of said cutting blade remote from said reciprocating means.

3. The improvement according to claim 1 including means connected to the end of said guide means closest to said reciprocating means to support said guide means, said connected means being connected to said removal means whereby said removal means moves said guide means with said cutting blade.

4. The improvement according to claim 1 in which:

said guide means extends to the opposite side of said material supporting means from said reciprocating means; and said cutting blade has its connecting edge remaining on the opposite side of the material from said reciprocating means during reciprocation of said cutting blade while said cutting blade is in cutting engagement with the material whereby said cutting blade remains in cutting engagement with the entire thickness of the material during reciprocation.

5. The improvement according to claim 4 including:

support means disposed on the opposite side of said material supporting means from said reciprocating means; and means supported by said support means and cooperating with said guide means to maintain said guide means in a position in which said cutting blade is maintained in its reciprocating plane by said guide means.

6. The improvement according to claim 5 in which:

said cooperating means is fixedly secured to the end of said guide means remote from said reciprocating means; and said cooperating means remains supported by said support means when said guide means is moved with said cutting blade by said removal means.

7. The improvement according to claim 6 including means connected to the end of said guide means closest to said reciprocating means to support said guide means, said connected means being connected to said removal means whereby said removal means moves said guide means with said cutting blade.

8. The improvement according to claim 7 in which said rotating means includes means to rotate both said connected means and said support means.